(12) United States Patent
Bender et al.

(10) Patent No.: US 12,183,935 B2
(45) Date of Patent: Dec. 31, 2024

(54) VEHICLE BATTERY SECURING SYSTEMS AND METHODS

(71) Applicant: Lyft, Inc., San Francisco, CA (US)

(72) Inventors: Adam Christopher Bender, Mountain View, CA (US); Andrew Michael Reimer, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 1129 days.

(21) Appl. No.: 16/836,259

(22) Filed: Mar. 31, 2020

(65) Prior Publication Data

US 2021/0202923 A1  Jul. 1, 2021

Related U.S. Application Data

(63) Continuation-in-part of application No. 16/728,600, filed on Dec. 27, 2019, now Pat. No. 11,077,767, and
(Continued)

(51) Int. Cl.
*B60L 50/60* (2019.01)
*B60L 53/80* (2019.01)
(Continued)

(52) U.S. Cl.
CPC .............. *H01M 50/20* (2021.01); *B60L 50/66* (2019.02); *B60L 53/80* (2019.02);
(Continued)

(58) Field of Classification Search
CPC .. H01M 50/20; H01M 50/166; H01M 50/258; H01M 50/264; H01M 50/256;
(Continued)

(56) References Cited

U.S. PATENT DOCUMENTS 5,477,936 A * 12/1995 Sugioka ................... B62J 43/28
180/68.5
5,513,721 A * 5/1996 Ogawa ................... B62K 19/46
180/68.5
(Continued)

FOREIGN PATENT DOCUMENTS

CN   206 954 312 U    2/2018
EP   0686550          12/1995
WO   WO 90/10568 A1   9/1990

*Primary Examiner* — James M Dolak
(74) *Attorney, Agent, or Firm* — Baker Botts L.L.P.

(57) ABSTRACT

Systems and methods related to securing batteries to micro-mobility transit vehicles are disclosed. For example, a micro-mobility transit vehicle may have a battery compartment and a battery compartment door having a first end and a second end. The battery compartment door may provide a floorboard surface for the micro-mobility transit vehicle where the first end of the battery compartment door is hingedly coupled to the micro-mobility transit vehicle and the second end of the battery compartment door includes at least one pair of prongs extending from the second end and at least one breakaway tab physically coupled to each pair of prongs. The battery compartment door and a battery disposed within the battery compartment may be electromechanically secured to the micro-mobility transit vehicle by engaging locking cams on the breakaway tabs.

15 Claims, 13 Drawing Sheets

Related U.S. Application Data a continuation-in-part of application No. 16/728,658, filed on Dec. 27, 2019, now Pat. No. 11,820,240.

(51) Int. Cl.
*H01M 50/166* (2021.01)
*H01M 50/20* (2021.01)

(52) U.S. Cl.
CPC ....... *H01M 50/166* (2021.01); *B60L 2200/24* (2013.01); *B60L 2270/34* (2013.01); *H01M 2220/20* (2013.01)

(58) Field of Classification Search
CPC . H01M 50/271; H01M 2220/20; B60L 50/66; B60L 50/00; B60L 50/50; B60L 50/64; B60L 50/60; B60L 53/80; B60L 2200/24; B60L 2270/34
See application file for complete search history.

(56) References Cited

U.S. PATENT DOCUMENTS

| | | | | |
|---|---|---|---|---|
| 5,613,569 | A * | 3/1997 | Sugioka | H01M 10/625 180/68.5 |
| 6,154,006 | A | 11/2000 | Hatanaka | |
| 6,619,679 | B2 * | 9/2003 | Lan | B62K 3/002 180/181 |
| 6,624,610 | B1 * | 9/2003 | Ono | B62J 43/16 320/104 |
| 6,752,229 | B2 * | 6/2004 | Ho | F02N 15/006 180/181 |
| 7,249,644 | B2 * | 7/2007 | Honda | B60L 50/66 310/68 B |
| 7,967,095 | B2 * | 6/2011 | Kosco | B62K 15/006 280/278 |
| 8,413,947 | B2 * | 4/2013 | Chiang | H01M 50/244 206/703 |
| 8,651,215 | B2 * | 2/2014 | Ogura | B60L 50/66 180/65.6 |
| 8,662,232 | B2 * | 3/2014 | Nakamura | B62J 43/16 180/220 |
| 8,739,908 | B2 * | 6/2014 | Taniguchi | B62J 43/16 180/68.5 |
| 8,905,170 | B2 * | 12/2014 | Kyoden | B62J 43/28 180/68.5 |
| 8,979,110 | B2 * | 3/2015 | Talavasek | B62M 6/60 280/279 |
| 9,070,925 | B2 * | 6/2015 | Nakamura | B62K 19/30 |
| 9,350,003 | B2 * | 5/2016 | Wen | H01M 50/262 |
| 9,440,698 | B2 * | 9/2016 | Dadoosh | B60L 53/14 |
| 10,384,556 | B1 * | 8/2019 | Miyata | H01M 50/249 |
| 10,930,903 | B2 * | 2/2021 | Mitsuyasu | B62M 6/90 |
| 10,994,620 | B2 * | 5/2021 | Shieh | B62K 25/286 |
| 11,211,661 | B2 * | 12/2021 | Durkee | H01M 50/202 |
| 11,260,926 | B2 * | 3/2022 | Schneider | B62J 43/16 |
| 11,325,678 | B2 * | 5/2022 | Wecker | B62K 19/40 |
| 11,524,591 | B2 * | 12/2022 | Barbosa, Jr. | B62J 17/02 |
| 11,981,218 | B2 * | 5/2024 | Kalligeros | G07C 9/28 |
| 11,981,380 | B2 * | 5/2024 | Kermani | B62D 29/004 |
| 12,030,391 | B2 * | 7/2024 | French | B60L 58/18 |
| 2007/0051548 | A1 | 3/2007 | Kosco | |
| 2011/0211325 | A1 | 9/2011 | Kawada | |
| 2014/0083787 | A1 | 3/2014 | Lyons | |
| 2016/0311494 | A1 * | 10/2016 | Schliewert | B62K 19/30 |
| 2017/0158070 | A1 | 6/2017 | Salasoo | |
| 2019/0326582 | A1 | 10/2019 | Berels et al. | |

\* cited by examiner

VEHICLE BATTERY SECURING SYSTEMS AND METHODS

CROSS-REFERENCE TO RELATED APPLICATIONS

This application is a continuation-in-part of, and claims priority to, U.S. patent application Ser. No. 16/728,600 filed on Dec. 27, 2019, and entitled VEHICLE BATTERY INTEGRATION SYSTEMS AND METHODS and U.S. patent application Ser. No. 16/728,658 filed on Dec. 27, 2019, and entitled VEHICLE BATTERY ASSEMBLY SYSTEMS AND METHODS, the contents of which are herein incorporated by reference in their entirety.

TECHNICAL FIELD

One or more embodiments of the present disclosure relate generally to powering electric vehicle and more particularly to systems and methods for securing batteries assemblies to electric vehicles.

BACKGROUND

Contemporary transportation services may incorporate a variety of different types of vehicles, including motorized or electric kick scooters, bicycles, and/or motor scooters generally designed to transport one or two people at once (collectively, micro-mobility transit vehicles). While micro-mobility transit vehicles provide an additional dimension of transportation flexibility, particularly when such vehicles are incorporated into a dynamic transportation matching system that links requestors or riders to transit vehicles temporary use, such flexibility is only realizable if a significant portion of the fleet of transit vehicles is ready for operation and/or individual nonoperational transit vehicles can be quickly serviced and made operational. As such, servicing a relatively extensive fleet of micro-mobility transit vehicles can present a significant and cumbersome investment and labor (e.g., time and cost) burden to a transportation services manager/servicer.

Therefore, there is a need in the art for systems and methods to reduce servicer burdens associated with servicing micro-mobility transit vehicles, particularly in the context of a dynamic transportation matching system providing transportation services incorporating such micro-mobility transit vehicles.

SUMMARY

Techniques are disclosed for systems and methods related to securing batteries to micro-mobility transit vehicles. In an example embodiment, a battery compartment door having a first end and a second end may be configured to provide a floorboard surface for a micro-mobility transit vehicle and cover a battery compartment of the micro-mobility transit vehicle. The first end of the battery compartment door may be hingedly coupled to a frame of the micro-mobility transit vehicle. The second end of the battery compartment door may have at least one pair of prongs extending therefrom and at least one breakaway tab physically coupled to each pair of prongs.

In various embodiments, a method for using a micro-mobility transit vehicle having a battery securing system is disclosed. The method may include electromechanically disengaging locking cams that secure a battery compartment door and battery in a battery compartment of the micro-mobility transit vehicle. After the locking cams have been disengaged, thereby unlocking the battery compartment door and battery, the battery compartment door may be rotated about a hinge to expose the battery compartment. A previous battery may be removed from the battery compartment via a carrying handle and in some cases by disengaging a mechanical interface of the battery from a receiving interface of the battery compartment. A battery electrical interface for a charged/replacement battery may be electrically coupled to an electrical interface of the battery compartment. The charged/replacement battery may be placed in the battery compartment to provide electric power to a propulsion system of the micro-mobility transit vehicle during operation of the micro-mobility transit vehicle. The battery compartment door may be rotated to cover the battery compartment and provide for a floor surface for a rider to place their feet while riding the micro-mobility transit vehicle. The battery compartment door and battery may be electromechanically secured to the micro-mobility transit vehicle by engaging the locking cams on breakaway tabs coupled to prongs disposed at an end of the battery compartment door. The breakaway tabs may rest on the battery such that the engaged locking cams secure both the battery compartment door and the battery in a locked position within the battery compartment.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
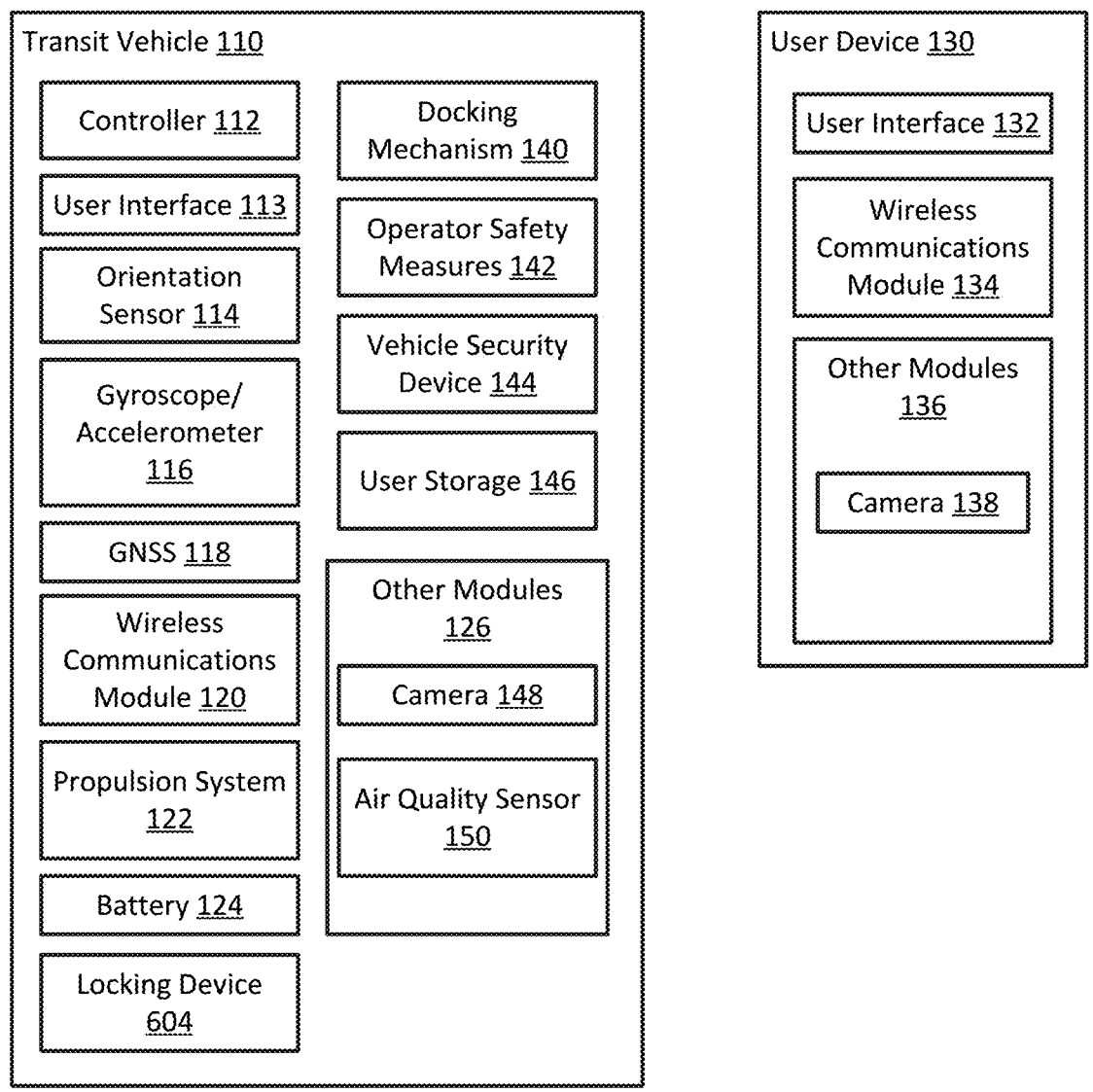
FIG. 1 illustrates a block diagram of a portion of a dynamic transportation matching system including a transit vehicle in accordance with embodiments of the disclosure.

In accordance with various embodiments of the present disclosure, battery securing systems for micro-mobility transit vehicles and related methodologies are provided to reduce burdens associated with servicing micro-mobility transit vehicles (e.g., motor scooters and/or other vehicles generally designed to transport one or two people at once). For example, in an embodiment, a battery compartment door having a first end and a second end may be configured to provide a floorboard surface of a micro-mobility transit vehicle and cover a battery compartment of the micro-mobility transit vehicle. The first end of the battery compartment door may be hingedly coupled to a frame of the micro-mobility transit vehicle. The second end of the battery compartment door may have at least one pair of prongs extending therefrom and at least one breakaway tab physically coupled to each pair of prongs. When a person attempts to remove the battery compartment door without first disengaging locking cams that lock the compartment door and a battery in place on the micro-mobility transit vehicle, the breakaway tabs may separate from the prongs of the compartment door such that a battery below the compartment door remains locked in place. The battery may remain locked in place due to the locking cams being still engaged on the breakaway tabs resting on one end of the battery and a physical interface (e.g., hooks, protrusions, etc.) at the other end of the battery and engaged into the battery compartment. In other words, both ends of the battery remain secured to the battery compartment, which may reduce battery theft and costs associated with battery theft.

A method for using a micro-mobility transit vehicle having a battery securing system according to various embodiments is disclosed. The method may include electromechanically disengaging locking cams that secure a battery compartment door and battery in a battery compartment of the micro-mobility transit vehicle. After the locking cams have been disengaged, thereby unlocking the battery compartment door and battery, the battery compartment door may be rotated about a hinge to expose the battery compartment. A previous battery may be removed from the battery compartment via a carrying handle and in some cases by disengaging a mechanical interface of the battery from a receiving interface of the battery compartment. In some implementations, the carrying handle may be made of one or more strands of elastic material such as rubber and bound together by a fabric covering so that the carrying handle is flexible yet rigid after a certain amount of stretch to provide quick and easy swap outs of batteries and convenient carrying options for operators.

The method may further include electrically coupling a battery electrical interface for a charged and/or replacement battery to an electrical interface of the battery compartment. The charged and/or replacement battery may be placed in the battery compartment to provide electric power to a propulsion system of the micro-mobility transit vehicle. The battery compartment door may be rotated to cover the battery compartment and provide for a floor surface for a rider to place their feet while riding the micro-mobility transit vehicle. The battery compartment door and battery may be electromechanically secured to the micro-mobility transit vehicle by engaging the locking cams on breakaway tabs coupled to prongs disposed at an end of the battery. The breakaway tabs may rest on the battery such that the engaged locking cams secure both the battery compartment door and the battery in a locked position.

As such, when a person attempts to remove the battery compartment door without first disengaging locking cams that lock the compartment door and the battery in place on the micro-mobility transit vehicle, the breakaway tabs may separate from the prongs of the compartment door such that the battery below the compartment door remains locked in place. The battery may remain locked in place due to the locking cams remaining engaged on the breakaway tabs resting on one end of the battery and a physical interface (e.g., hooks, protrusions, etc.) at the other end of the battery that are engaged into the battery compartment. In other words, both ends of the battery remain secured to the battery compartment, which may reduce battery theft and the servicing costs associated with battery theft.

FIG. 1 illustrates a block diagram of a portion of a dynamic transportation matching system (e.g., system 100) including a transit vehicle 110 in accordance with an embodiment of the disclosure. In the embodiment shown in FIG. 1, system 100 includes transit vehicle 110 and user device 130. In general, transit vehicle 110 may be a passenger vehicle designed to transport a single user (e.g., a micro-mobility transit vehicle) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micro-mobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a manager/servicer providing transit vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data. In some embodiments, a controller area network bus (CAN bus) may be used to allow controller 112 and various sensors/elements of transit vehicle to communicate.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, wireless communications module 120, and/or locking device 604. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility transit vehicle, as described herein.

In various embodiments, locking device 604 may be implemented as a battery locking device configured to engage locking cams to secure battery 124 and a battery compartment door to a frame of transit vehicle 110, as described further herein.

Transit vehicles implemented as micro-mobility transit vehicles may include a variety of additional features designed to facilitate transit management and user and environmental safety. For example, as shown in FIG. 1, transit vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, actuated lighting (e.g., articulated lighting coupled to an actuator), and/or other lighting coupled to and/or associated with transit vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
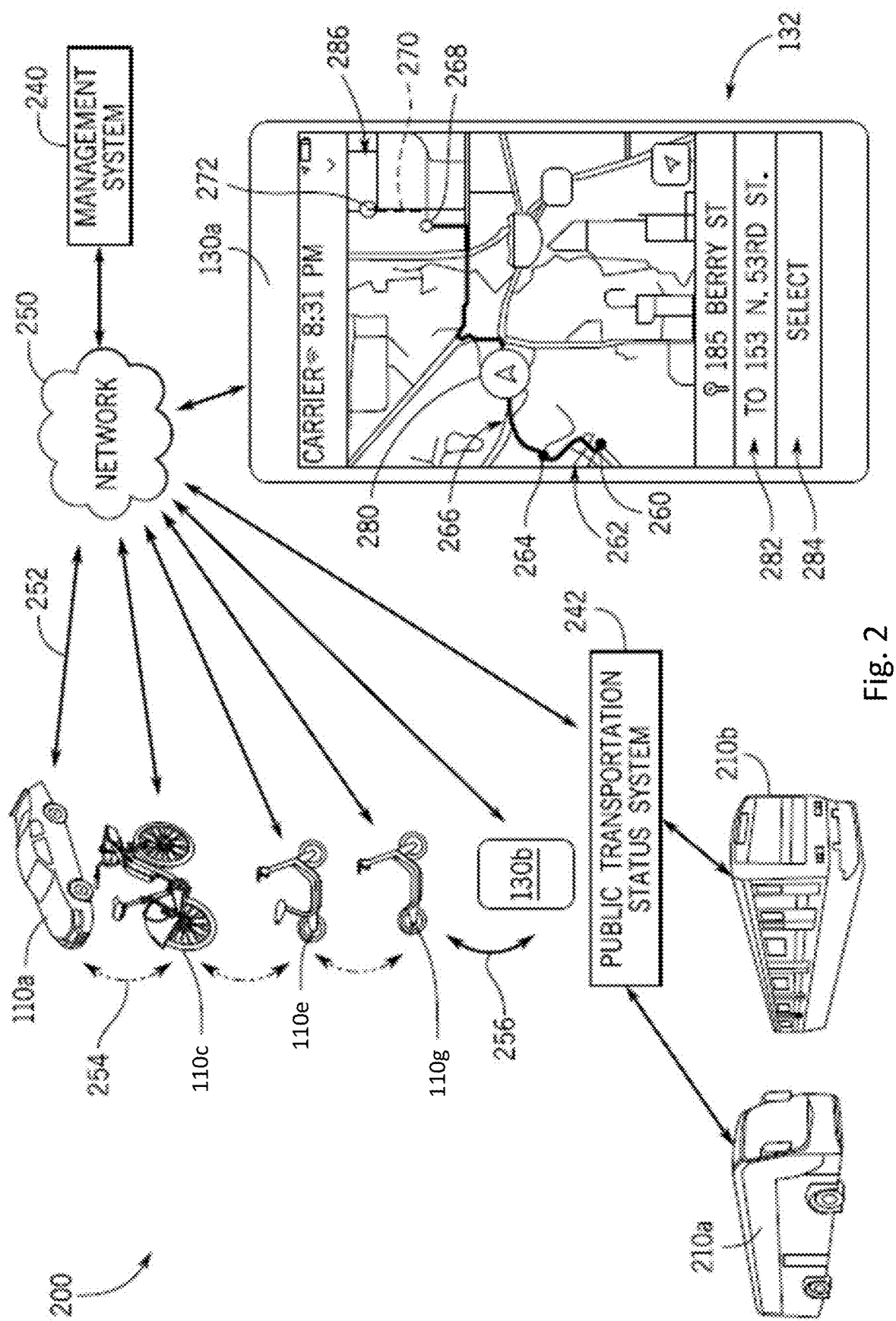
FIG. 2 illustrates a block diagram of a dynamic transportation matching system incorporating a variety of transportation modalities in accordance with embodiments of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a, 110c, 110e, 110g and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a, 110c, 110e, 110g and/or public transportation vehicles 210a-b. For example, the transportation request may be a request to use (e.g., reserve or rent) one of transit vehicles 110a, 110c, 110e, and 110g. The transportation request may be transmitted to management system 240 over WAN 250, allowing management system 240 to poll status of transit vehicles 110a, 110c, 110e, and 110g and to select one of transit vehicles 110a, 110c, 110e, and 110g to fulfill the transportation request; receiving a fulfillment notice from management system 240 and/or from the selected transit vehicle, and receiving navigation instructions to proceed to or otherwise meet with the selected transit vehicle. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a, 110c, 110e, and 110g, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a, 110c, 110e, and 110g, as described herein.

User device 130a in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3:
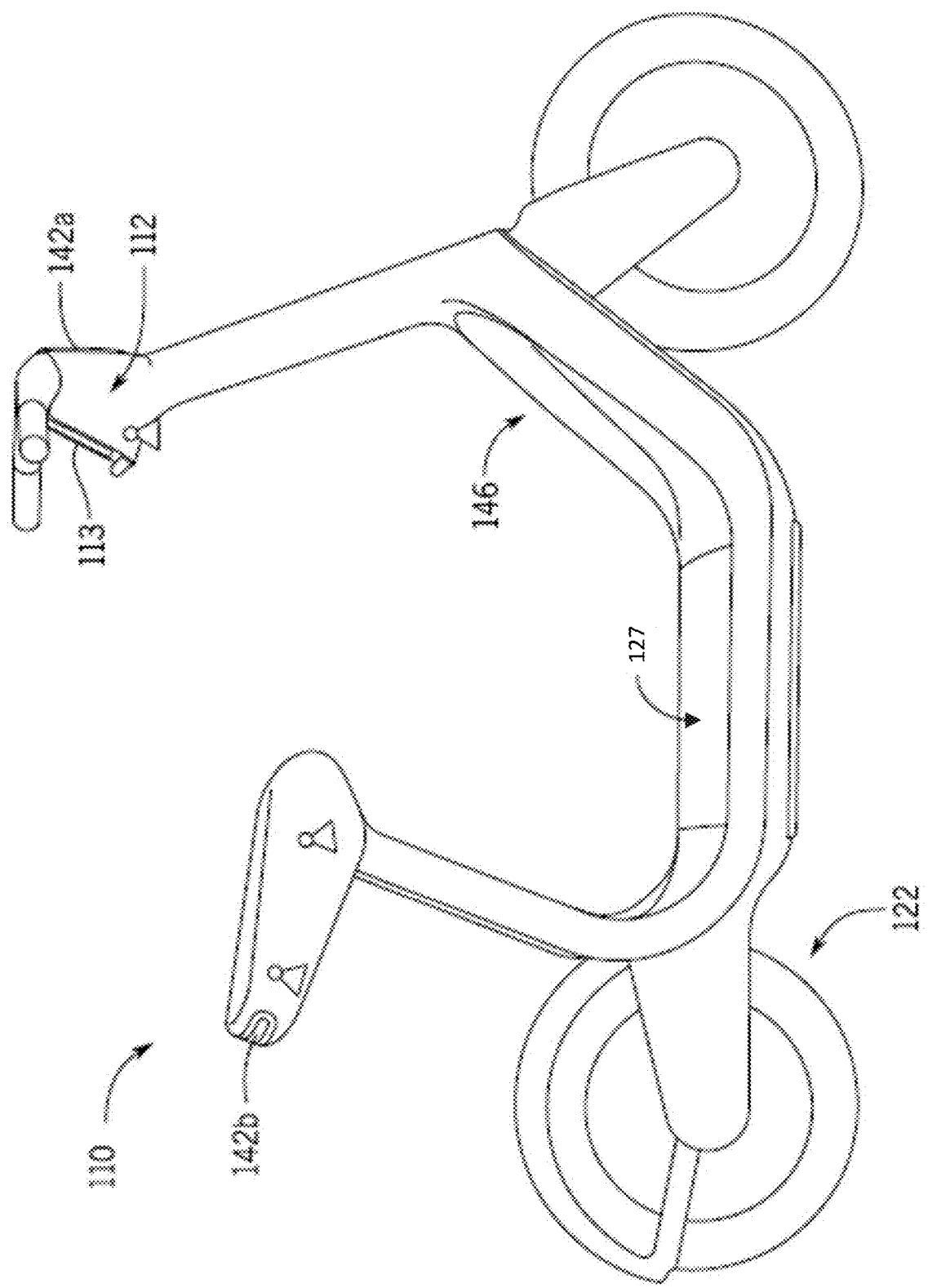
FIG. 3 illustrates a diagram of a micro-mobility transit vehicle for use in a dynamic transportation matching system in accordance with embodiments of the disclosure.

FIG. 3 illustrates an example embodiment of a micro-mobility transit vehicle 110, which may be integrated with mobile mesh network provisioning systems in accordance with an embodiment of the disclosure. For example, micro-mobility transit vehicle 110 may correspond to a motorized sit-scooter for reserve that is integrated with the various elements of system 100 and may be configured to participate in dynamic transportation matching system 200 of FIG. 2. Transit vehicle 110 may include user interface 113, propulsion system 122, battery compartment 127, controller/wireless communications module/cockpit enclosure 112, user storage 146 (e.g., implemented as a storage recess), and operator safety measures 142a and 142b, which may be implemented as various types of headlight assemblies, taillight assemblies, programmable light elements/strips/spotlights, and/or reflective strips, as described herein. As shown in FIG. 3, transit vehicle 110 may also be implemented with various other vehicle light assemblies to increase visibility, to provide ambient lighting, and/or to provide lighted beaconing, as described herein.

Figure 4:
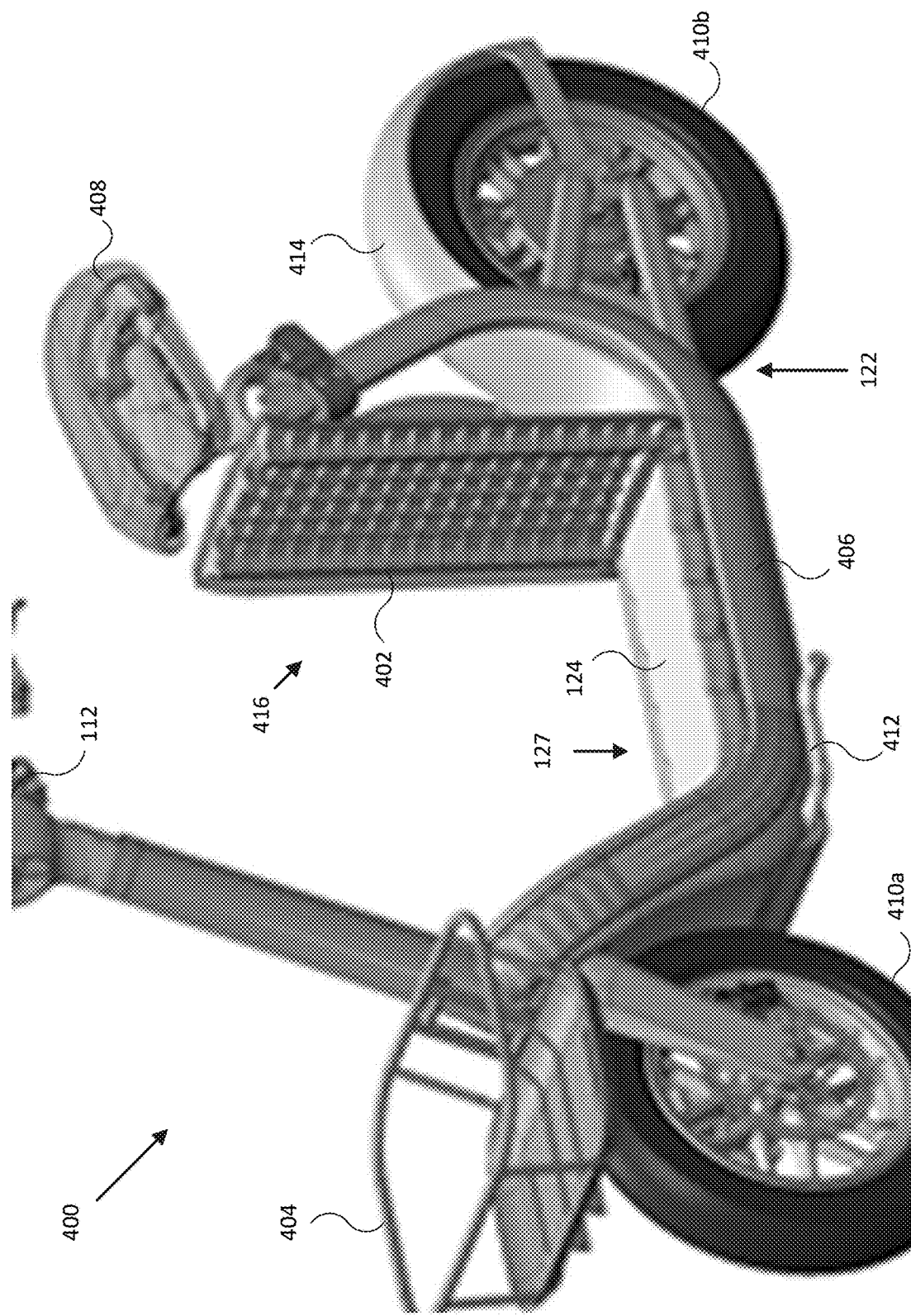
FIG. 4 illustrates a diagram of a micro-mobility transit vehicle for use in a dynamic transportation matching system in accordance with embodiments of the disclosure.

FIG. 4 illustrates a micro-mobility transit vehicle 400, which may be integrated with mobile mesh network provisioning systems in accordance with an embodiment of the disclosure. For example, micro-mobility transit vehicle 400 may correspond to a motorized sit-scooter for reserve that is integrated with the various elements of system 100 and may be configured to participate in dynamic transportation matching system 200 of FIG. 2. Transit vehicle 400 may include propulsion system 122, battery compartment 127, battery compartment door 402 controller/wireless communications module/cockpit enclosure 112, user storage 404 (e.g., implemented as a storage basket), frame 406, wheels 410a and 410b, seat 408, kickstand 412, and rear fender 414. In some implementations, transit vehicle 400 may be transit vehicle 110.

As shown in FIG. 4, battery compartment door 402 may be hingedly coupled to frame 406 such that compartment door 402 may be rotated into an open position 416 exposing battery compartment 127 and battery 124 therein. In some embodiments, battery compartment door may be hingedly coupled to an inner rear wall of battery compartment 127 to similarly be rotatable to open position 416. In some embodiments, battery compartment door 402 may be hingedly coupled to rear fender 414 to similarly be rotatable to open position 416. When battery compartment door 402 is rotated into a closed position over battery 124 and battery compartment 127, battery compartment door 402 may act as a floorboard surface for micro-mobility transit vehicle 400. In this regard, battery compartment door may distribute a rider's weight along parallel members of frame 406 disposed along battery compartment 127. In some cases, battery compartment 127 may be a subframe of frame 406 and/or attached to frame 406 (e.g., welded) as an undercarriage.

In some embodiments, battery 124 may include a battery enclosure (e.g., container) that has an enclosure cavity and a battery electrical interface configured to electrically couple to an electrical interface of micro-mobility transit vehicle 400 to power propulsion system 122 with a battery cell disposed within the enclosure cavity and electrically coupled to the battery electrical interface.

Figure 5:
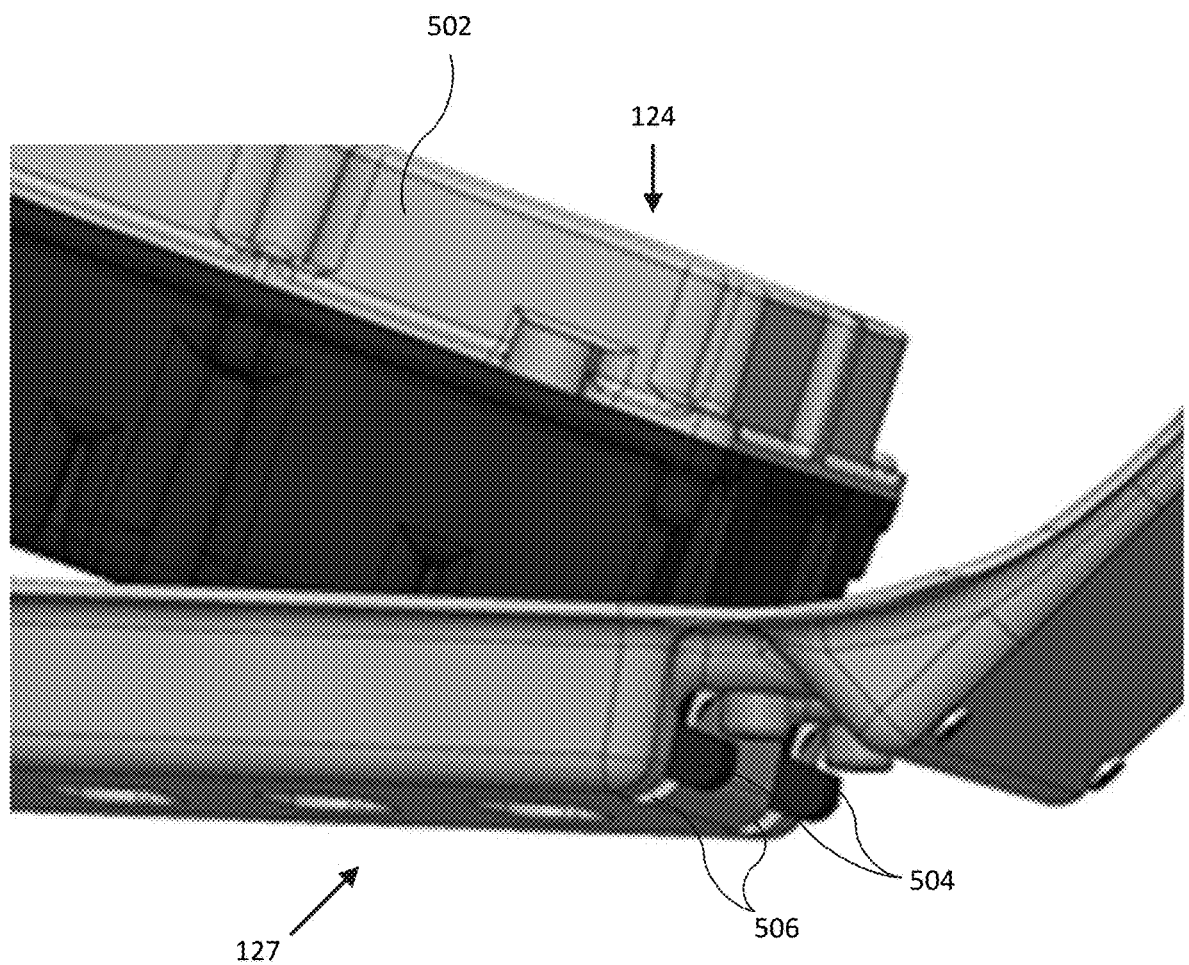
FIG. 5 illustrates a view of a battery compartment of a micro-mobility transit vehicle in accordance with embodiments of the disclosure.

FIG. 5 illustrates battery compartment 127 of a micro-mobility transit vehicle 400 in accordance with an embodiment of the disclosure. As shown in FIG. 5, battery 124 may include a battery enclosure 502 that has an enclosure cavity configured to house a battery (e.g., battery cells). Battery 124 may further include a battery electrical interface configured to electrically couple to an electrical interface of the micro-mobility transit vehicle to power a propulsion system with the battery housed within the enclosure cavity and electrically coupled to the battery electrical interface.

In the embodiment shown in FIG. 5, battery 124 includes a mechanical interface 504. Mechanical interface 504 may be one or more protrusions, hooks, pegs, clasps, fasteners, etc. extending from battery enclosure 502. Mechanical interface 504 may be inserted into receiving interface 506, which may include one or more slots, holes, recessions, or other physical receiving interface defined in a side of battery compartment 127 and configured to integrate with mechanical interface 504 to secure an end of battery 124 into battery compartment 127. In this regard, receiving interface 506 may be configured to receive one or more protrusions extending from battery enclosure 502. In an aspect, the slots may have enough vertical clearance to allow battery 502 to be placed into and removed from battery compartment 127 at the end of battery 124 where the protrusions extend. Mechanical interface 506 and receiving interface 506 may be complementary such that battery 124 would have to be removed from battery compartment 127 by lifting an end opposite end of battery 124 from the mechanical interface. Thus, as further discussed herein, when the side of battery 124 opposite of mechanical interface 506 is secured and/or locked into place, battery 124 may be physically secured in battery compartment 127. As such, battery 124 may be less susceptible to vandalism or theft.

Figure 6:
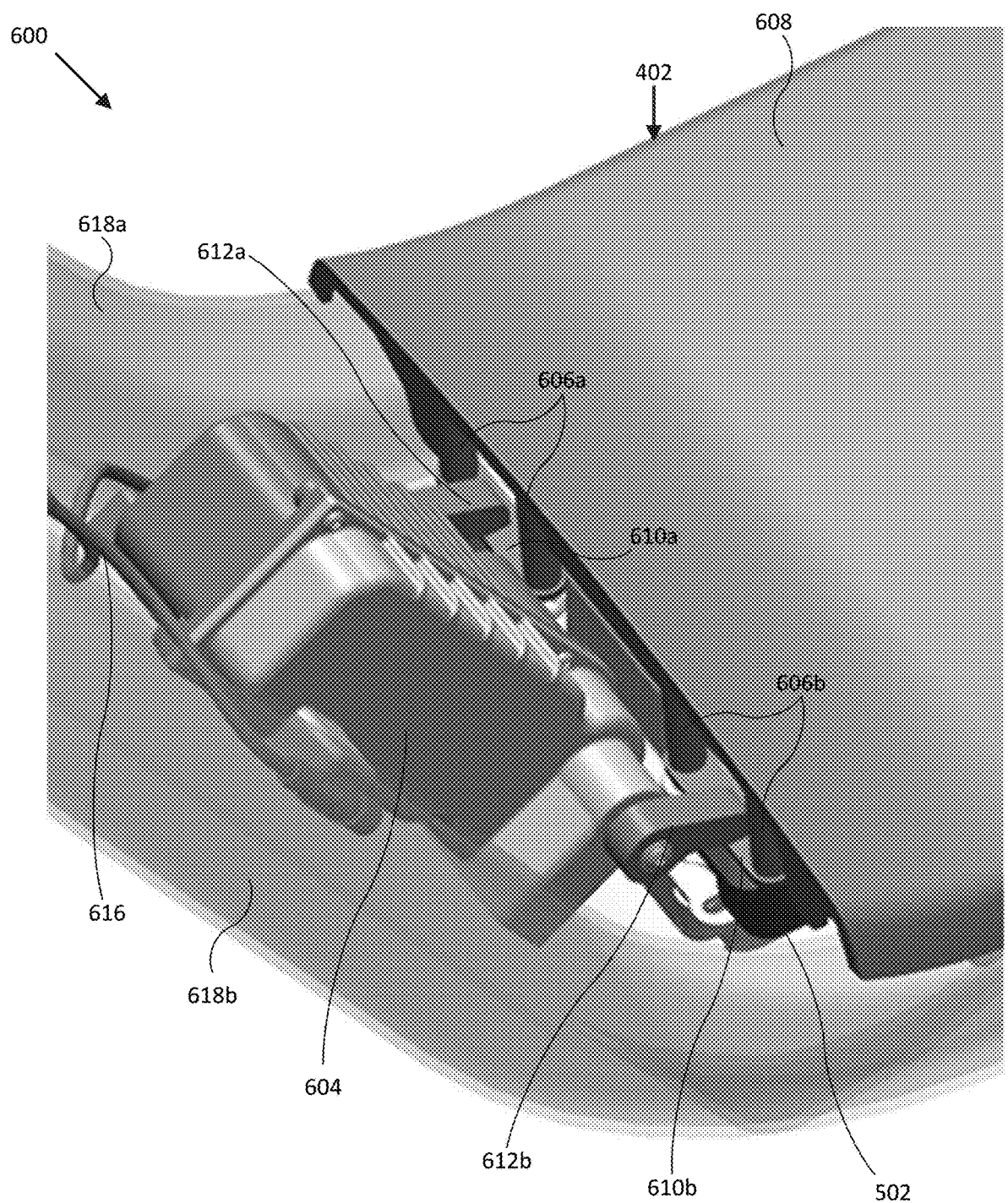
FIGS. 6-9 illustrate views of a battery compartment locking system in accordance with embodiments of the disclosure.

FIG. 6 illustrates a battery compartment locking system 600 of a micro-mobility transit vehicle 400 in accordance with an embodiment of the disclosure. Battery compartment system 600 may include a battery compartment door 402 and a locking device 604. Battery compartment door 402 may include prong pairs 606a and 606b that extend from an end of battery compartment door 402 on a side of battery compartment door 402 that is opposite of a side that includes a floorboard surface 608. Prong pairs 606a and 606b may be physically coupled to breakaway tabs 610a and 610b. Battery compartment door 402 may be in a closed position when battery compartment door 402 is placed over a battery compartment to cover the battery compartment and when breakaway tabs 610a and 610b rest on battery enclosure 502.

Breakaway tabs 610a and 610b may be configured to physically separate from prong pairs 606a and 606b when battery compartment door 402 is opened (e.g., pulled off, pried, force-opened) while locking cam 612a and 612b are engaged on breakaway tabs 610a and 610b. Thus, when a compartment door 402 is ripped off by, for example, an act of vandalism, compartment door 402 may be removed but breakaway tabs 610a and 610b will remain by engaged locking cams 612a and 612b such that battery enclosure 502 remains secured to a battery compartment.

Locking device 604 may include locking cams 612a 612b configured to electromechanically engage locking cams 612a and 612b on breakaway tabs 610a and 610b. In this regard, spaces defined between compartment door 608, pairs of prongs 606a and 606b, and breakaway tabs 610a and 610b provide enough clearance for locking cams 612a and 612b to rotate from an open, disengaged position through the spaces to a locked or closed position and engaged on breakaway tabs 610a and 610b.

Locking device 604 may be disposed between members 618a and 618b of a frame of the micro-mobility transit vehicle such that locking cams 612a and 612b face the end of compartment trap door 402 where the prong pairs 606a and 606b and breakaway tabs 610a and 610b are disposed.

In some embodiments, locking device 604 may be powered by a battery disposed in battery enclosure 502. In other embodiments, locking device 604 may be powered by its own independent battery or another battery of the micro-mobility transit vehicle electrically coupled to locking device 604.

In various embodiments, connection 616 (e.g., wire, cable) may be used to electrically couple locking device 604 to a controller of the micro-mobility transit vehicle (e.g., controller 112 herein). In this regard, the controller may control operation of locking device 604. Signals may be communicated to the controller from management system 240 or a mobile device (e.g., user device 130 herein) to operate locking device 604 as discussed in the disclosure. However, in some embodiments, locking device 604 may include wireless communication modules that allow controller 112, user device 130, or management system 240 to communicate and control the locking device's 604 operations.

Figure 7:
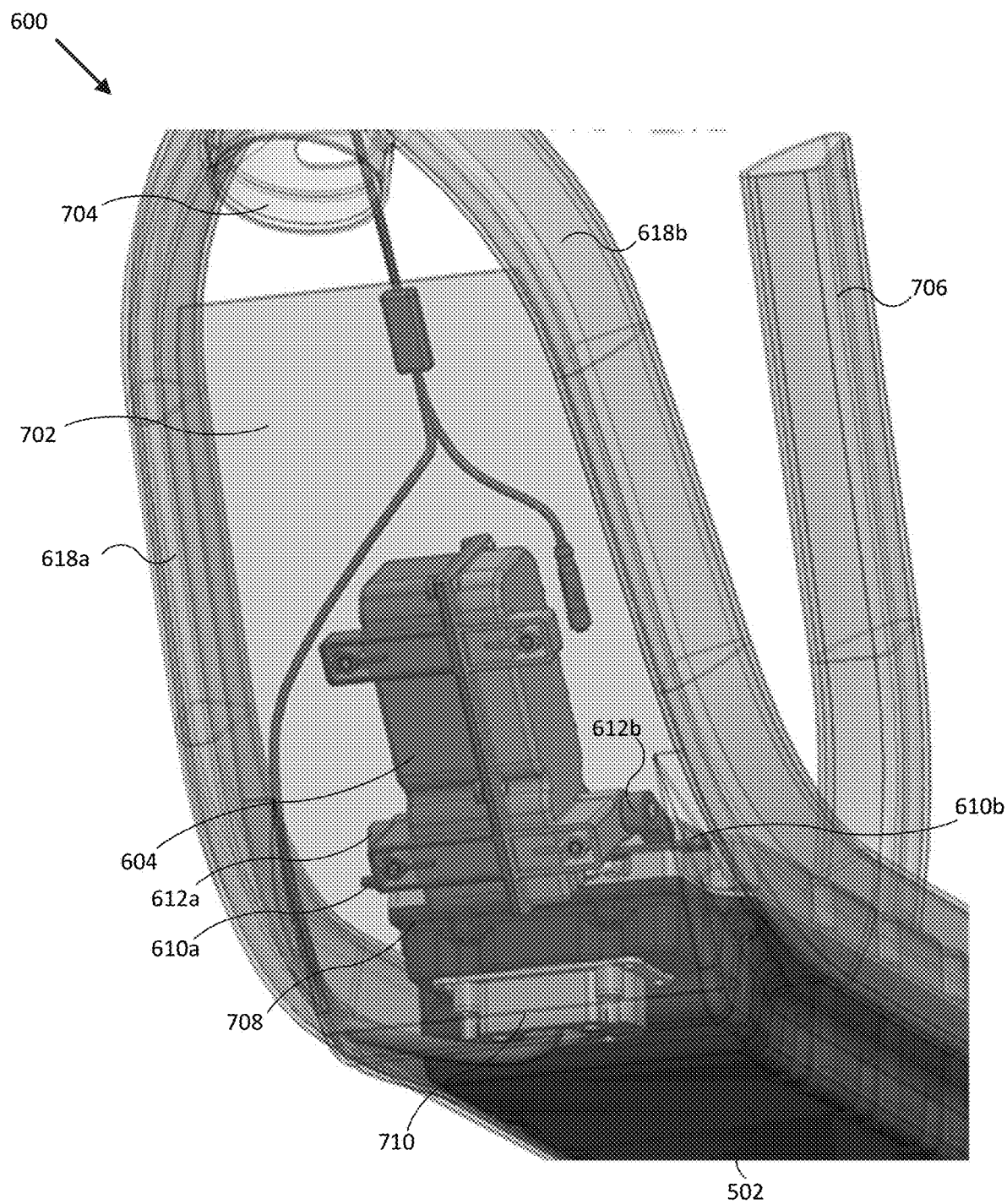

FIG. 7 illustrates a view of battery compartment locking system 600 of FIG. 6 with battery compartment door 402 removed in accordance with an embodiment of the disclosure. Locking device 604 may be mounted on a subframe 702 (shown as transparent for clarity in FIG. 7) between members 618a and 618b of the frame of the micro-mobility transit vehicle. Other parts of the frame include headtube 704 and seat post 706.

As shown in FIG. 7, when battery compartment door 402 is removed (e.g., ripped off) while locking cams 612a and 612b are engaged on breakaway tabs 610a and 610b, then breakaway tabs 610a and 610b may separate from prongs of battery compartment door 402 and remain secured over a protrusion 708 (e.g., lip, edge, overhang, etc.) of battery enclosure 502. As such, when in an act of vandalism, when battery compartment door 402 is removed from the micro-mobility transit vehicle, the locking cams 612a and 612b engaged on breakaway tabs 610a, 610b over protrusion 708 will keep an end of battery enclosure 502 secure in the battery compartment. The retention interfaces discussed in reference to FIG. 5 may be used to keep an opposing end of battery enclosure 502 secure in the battery compartment. Thus, both ends of battery enclosure 502 may be secured into the battery compartment.

In some embodiments, the battery compartment may include an electrical interface 710 configured to electrically couple with a battery electrical interface of the battery. Electrical interface 710 may provide a connection to various components of the micro-mobility transit vehicle to provide power to the various components. For example, a propulsion system 122 of the micro-mobility transit vehicle 400 may be electrically coupled to electrical interface 710.

Figure 8:
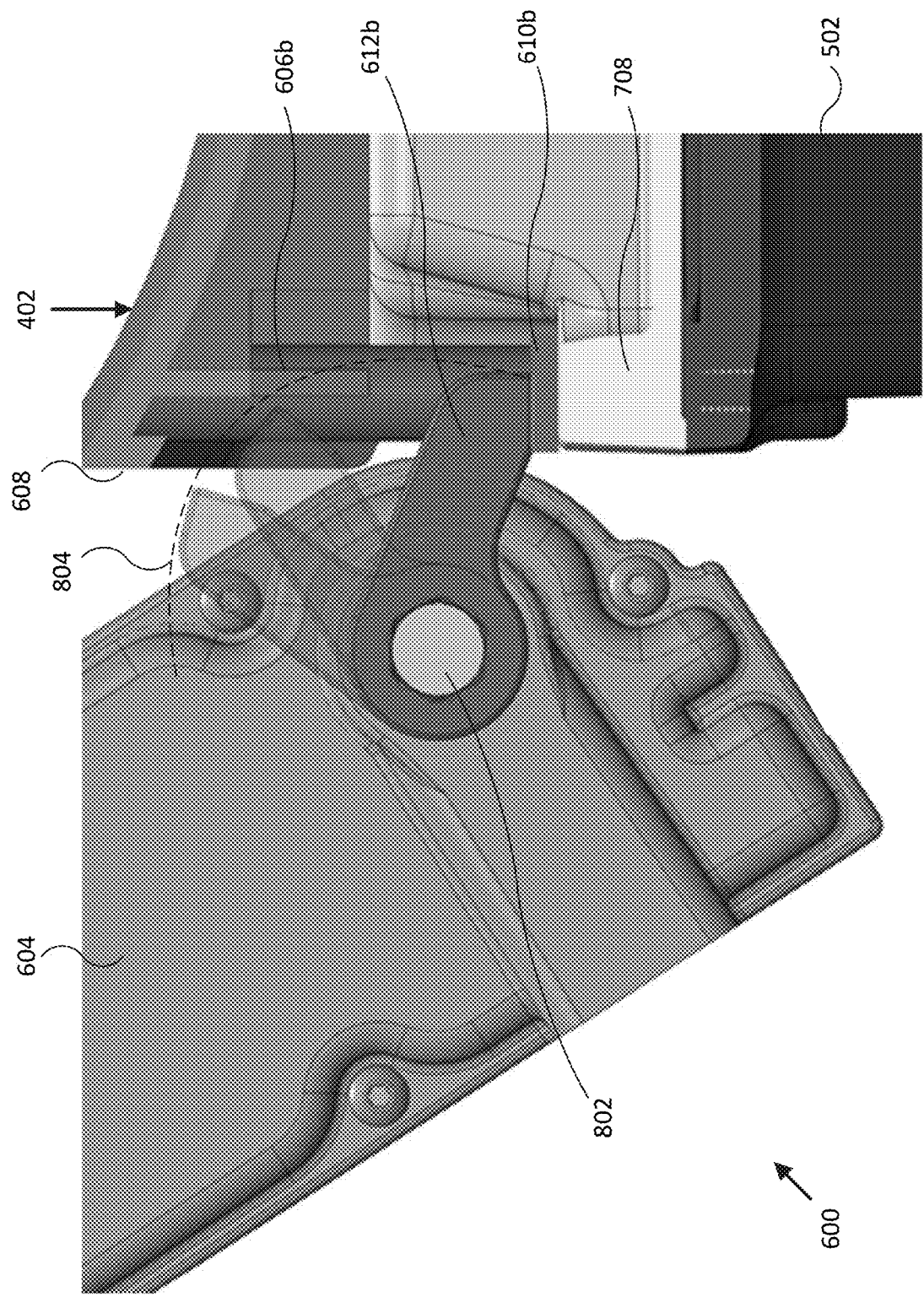

FIG. 8 illustrates a view of battery compartment locking system 600 of FIG. 6 as locking cam 612b is rotated from a disengaged position to an engaged position on breakaway tab 610b in accordance with an embodiment of the disclosure. As shown in FIG. 8, locking cam 612b rotates about an axis 802 such that locking cam 804 rotates along arc 804. As locking cam 612b rotates, there may be clearance along arc 804 such that locking cam 612b can rotate between a disengaged position and an engaged position onto breakaway tab 610b. In this regard, a space defined between floorboard surface 608 of compartment door 608, pair of prongs 606b, and breakaway tab 610b should provide enough clearance for locking cam 612b to rotate from the disengaged (e.g., open, unlocked) position through the space to an engaged (e.g., closed, locked) position on breakaway tab 610b.

As discussed above and reiterated with respect to FIG. 8, if battery compartment door 402 is ripped off (e.g., forcefully removed) while locking cam 612b is engaged on breakaway tab 610b, then breakaway tab 610b may separate from prongs 606b of battery compartment door 402 and remain secured over protrusion 708 of battery enclosure 502. As such, when there is an act of vandalism, wherein battery compartment door 402 is forcefully removed from the micro-mobility transit vehicle, locking cam 612b engaged on breakaway tab 610b over protrusion 708 will keep an end of battery enclosure 502 secure in the battery compartment. The retention interfaces discussed in reference to FIG. 5 may be used to keep an opposing end of battery enclosure 502 secure in the battery compartment 127. Thus, both ends of battery enclosure 502 may be secured into the battery compartment even though battery compartment door 402 has been removed.

Figure 9:
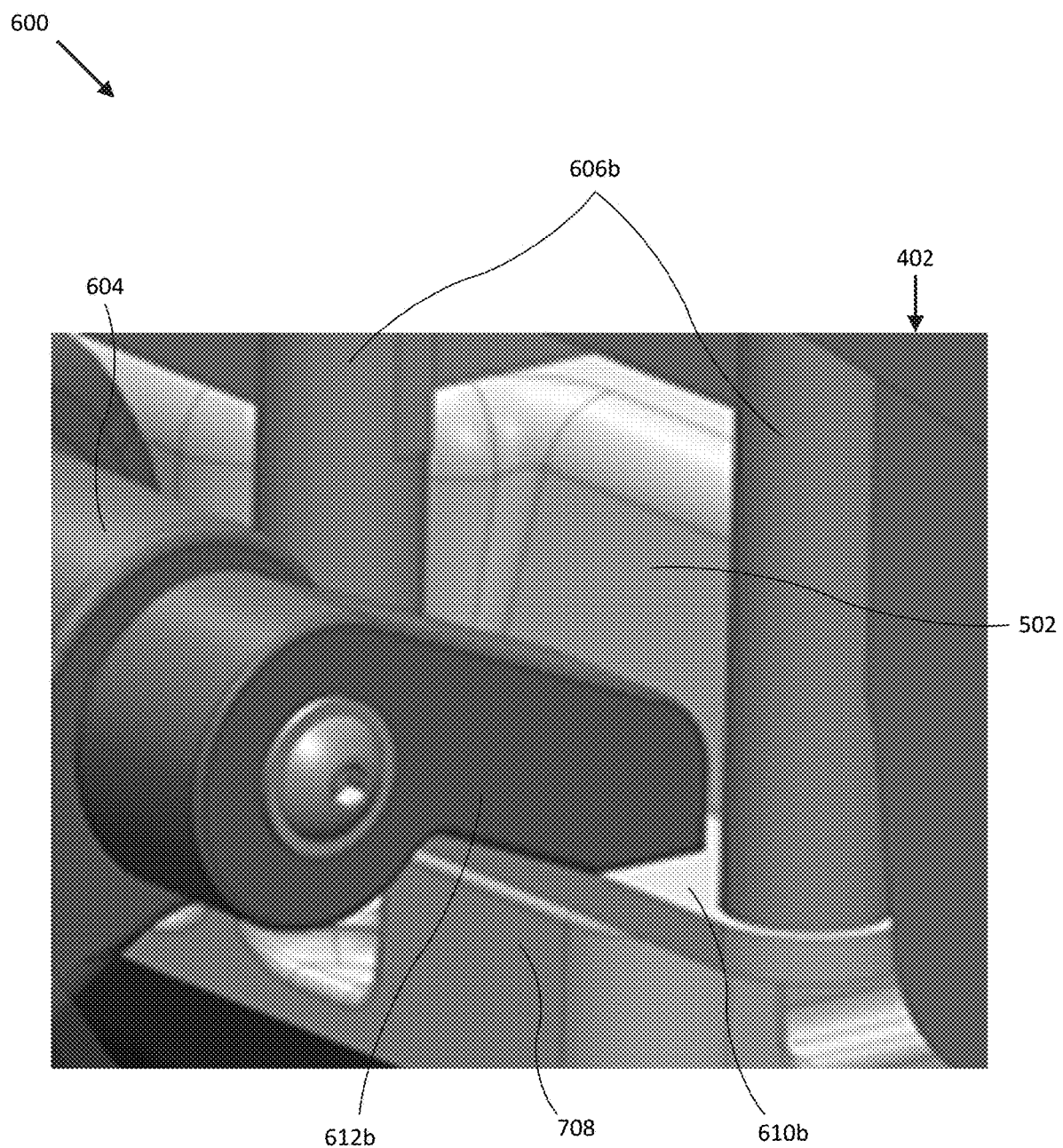

FIG. 9 illustrates a view of locking cam 612b in an engaged position on breakaway tab 610b in accordance with an embodiment of the disclosure. As shown in FIG. 9, locking cam 612b rotates between pair of prongs 606b to engage breakaway tab 610b and consequently protrusion 708 of battery enclosure 502 to assist in securing battery enclosure 502 to the battery compartment 127. In various embodiments, a presence of the battery compartment door 402 or the battery enclosure 502 may be detected based on locking cam 612b over-traveling an expected location of battery compartment door 402 and/or battery enclosure 502. For example, an actuator that controls the locking cams may be able to detect that the locking cams have rotated beyond what was expected if the battery compartment door 402 and battery enclosure 502 had been present. In this regard, a controller linked to the actuator may be able to detect that the battery compartment door 402 and battery enclosure 502 are missing, and consequently rotate the locking cams back to an open position. Furthermore, the controller may be able to provide a notification via a CAN bus of the transit vehicle. The notification may display on a display associated with the transit vehicle or may be communicated to a user device associated with the transit vehicle as discussed herein.

Figure 10:
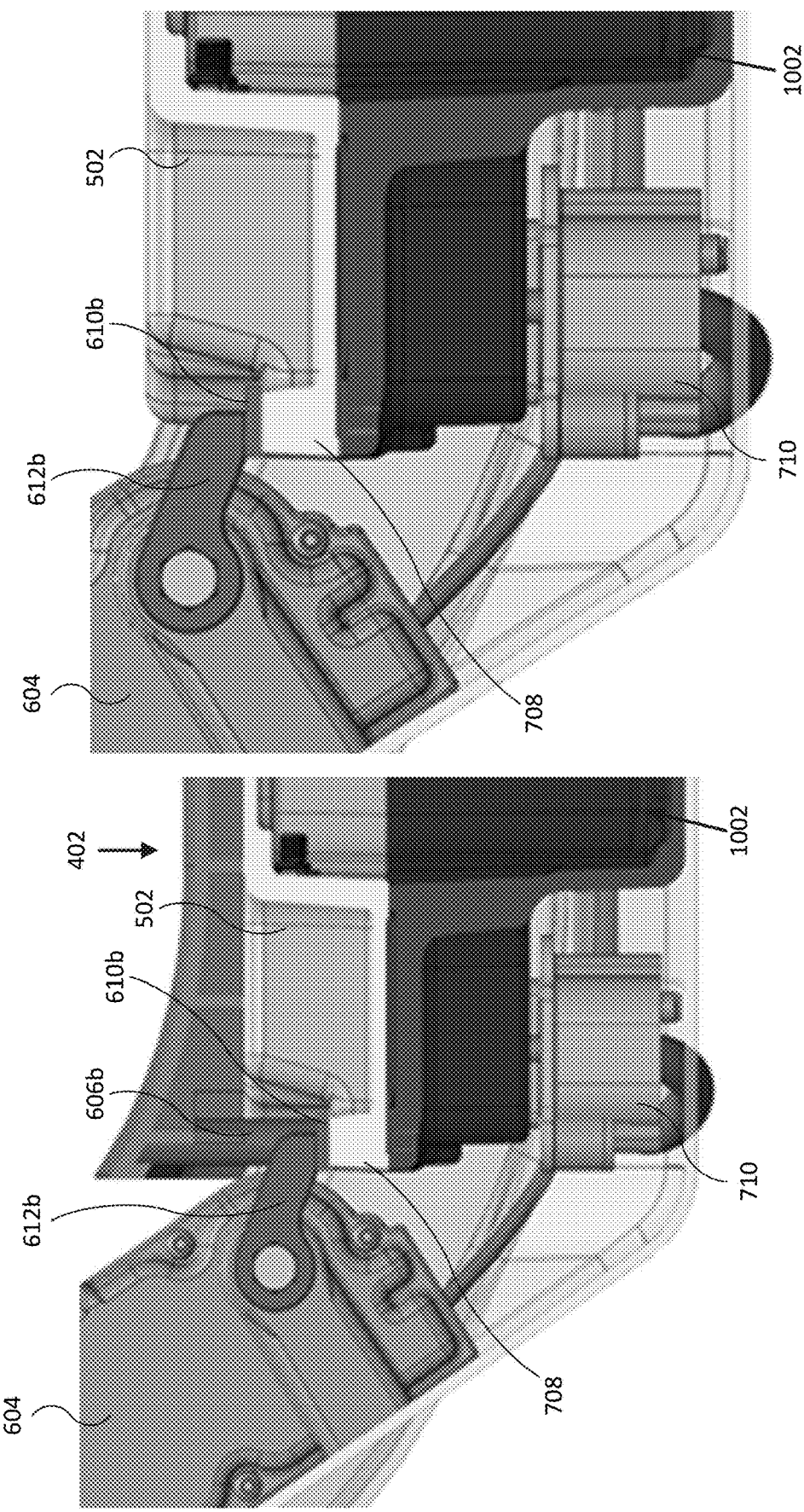
FIG. 10A illustrates a view of a battery compartment locking system in accordance with embodiments of the disclosure.
FIG. 10B illustrates a view of a battery compartment locking system of FIG. 10A with a battery compartment door removed in accordance with embodiments of the disclosure.

FIG. 10A illustrates a view of battery compartment locking system 600 of FIG. 6 where locking cam 612b is in an engaged position on breakaway tab 610b in accordance with an embodiment of the disclosure. By comparison, FIG. 10B, illustrates an example embodiment in which battery compartment door 402 has been forcefully removed while locking cam 612b is engaged on breakaway tab 610b. As shown in FIG. 10B, breakaway tab 610b may separate from prongs 606b of battery compartment door 402 and remain secured over protrusion 708 of battery enclosure 502. As such, when battery compartment door 402 is forcefully removed from the micro-mobility transit vehicle 400, locking cam 612b engaged on breakaway tab 610b over protrusion 708 will keep an end of battery enclosure 502 secure in the battery compartment 127. The retention interfaces discussed in reference to FIG. 5 may be used to keep an opposing end of battery enclosure 502 secure in the battery compartment 127 such that both ends of battery enclosure 502 may be secured into the battery compartment 127 even though battery compartment door 402 has been removed.

In various embodiments, a battery may be disposed in an enclosure cavity 1002 of battery enclosure 502 and configured to electrically couple to interface 710 via a battery electrical interface disposed in enclosure cavity 1002.

Figure 11:
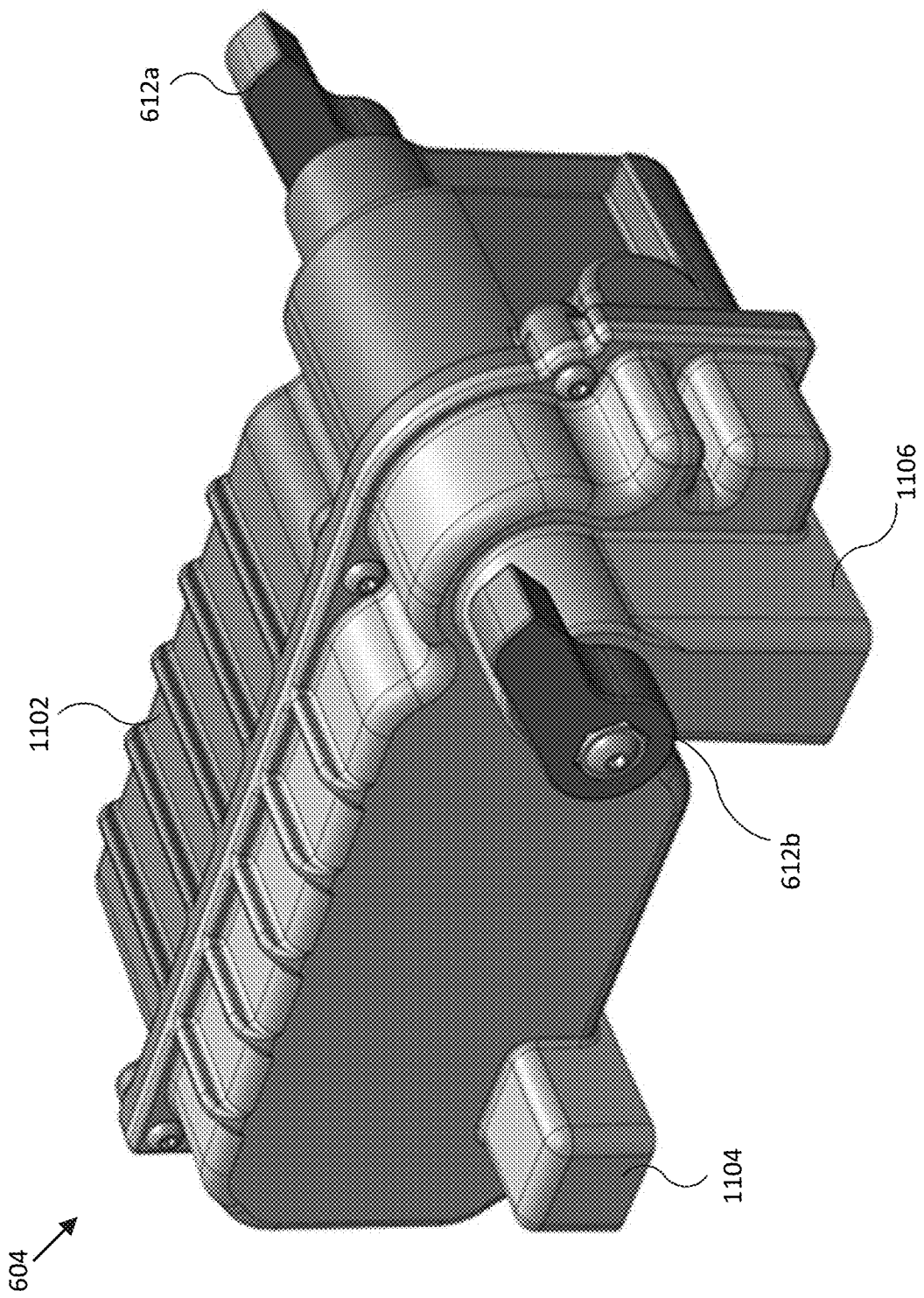
FIG. 11 illustrates a view of a locking device in accordance with embodiments of the disclosure.
Figure 12:
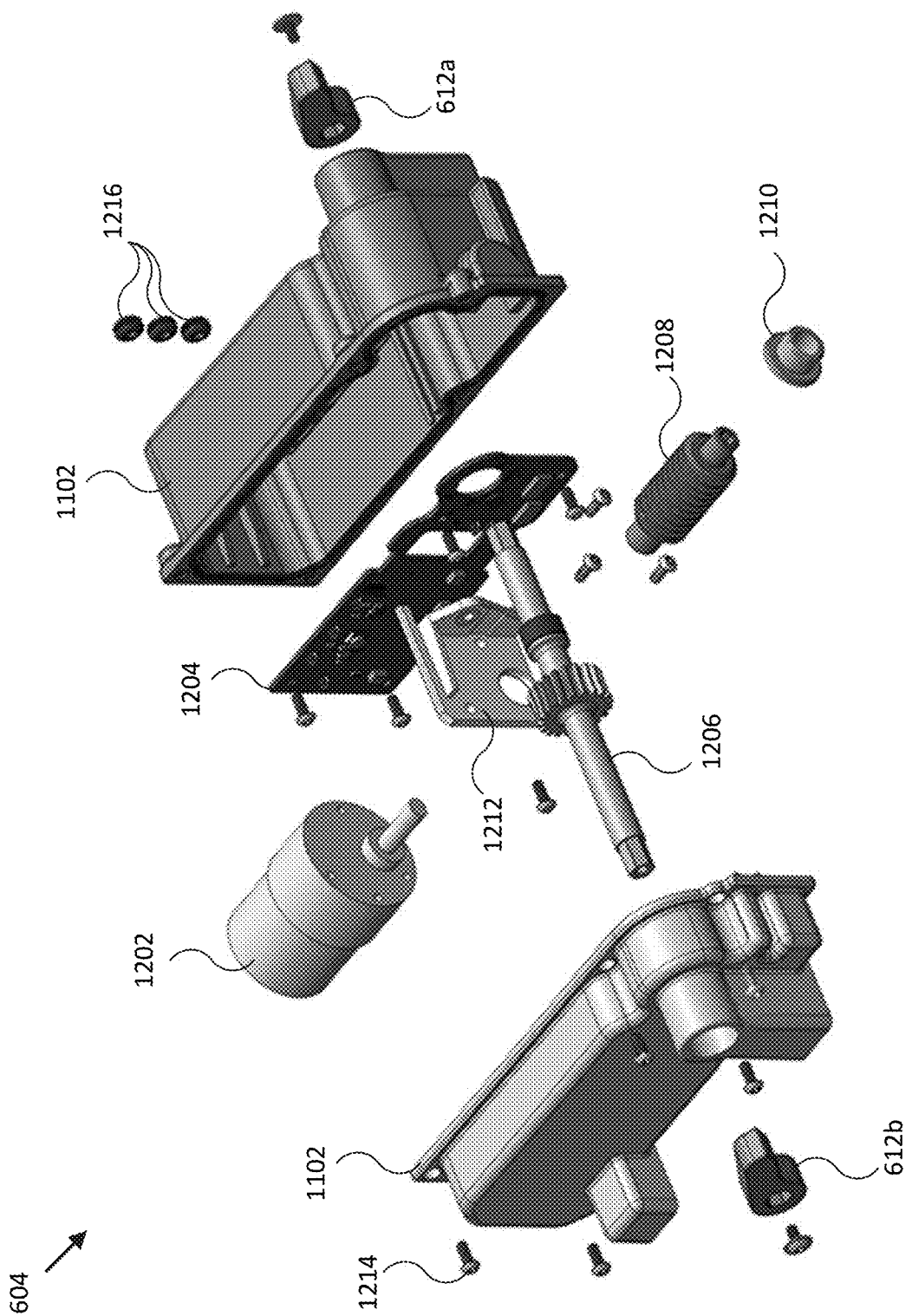
FIG. 12 illustrates an exploded view of the locking device of FIG. 11 in accordance with embodiments of the disclosure.

FIG. 11 illustrates a locking device 604 according to one or more embodiments of the present disclosure. Locking device 604 may include a housing 1102, locking cams 612a and 612b, and mounts (e.g., mounts 1104 and 1106) to secure locking device 604 to subframe 702. As illustrated in FIG. 12, locking device 604 may include various external and internal components. Some of the components may be configured to operate locking cams 612a and 612b as discussed herein. For example, locking device 604 may further include geared motor 1202, printed circuit board (PCB) 1204, worm gear shaft 1206, worm screw 1208, thrust bushing 1210, motor mount 1212, fasteners (e.g., fastener 1214), and wire seals 1216. Locking device 604 may be mounted to subframe 702 of a micro-mobility transit vehicle 400 and configured to electromechanically engage locking cams 612a and 612b on breakaway tabs 610a and 610b. PCB 1204 may include a controller configured to control geared motor 1202. Geared motor 1202 may be an electromechanical actuator configured to actuate worm screw 1208 and rotate locking cams 612a and 612b via worm gear shaft 1206.

As discussed in the present disclosure, locking cams 612a and 612b may secure battery compartment door 402 and battery enclosure 502 to the battery compartment 127, which may be a subframe of the micro-mobility transit vehicle 400. In various embodiments, locking device 604 may be configured to include less locking cams or more locking cams to correspond to a number of breakaway tabs (e.g., one or more) of battery compartment door 402.

In some embodiments, PCB 1204 may include one or more wireless communications modules configured to communicate with wireless communications module 120 of transit vehicle 110 or wireless communications module 134 of user device 130. As such, PCB 1204 may be able to receive a wireless communication with instructions to control locking device 604 to lock or unlock (e.g., engage or disengage) battery compartment door 402 and battery enclosure 502. In an example use case, a technician may use a mobile device to provide an NFC signal to locking device 604 to cause the controller of PCB 1204 to engage locking cams 612a and 612b on breakaway tabs 610a and 610b to secure battery compartment door 402 and battery enclosure 502 to the micro-mobility transit vehicle 400.

Figure 13:
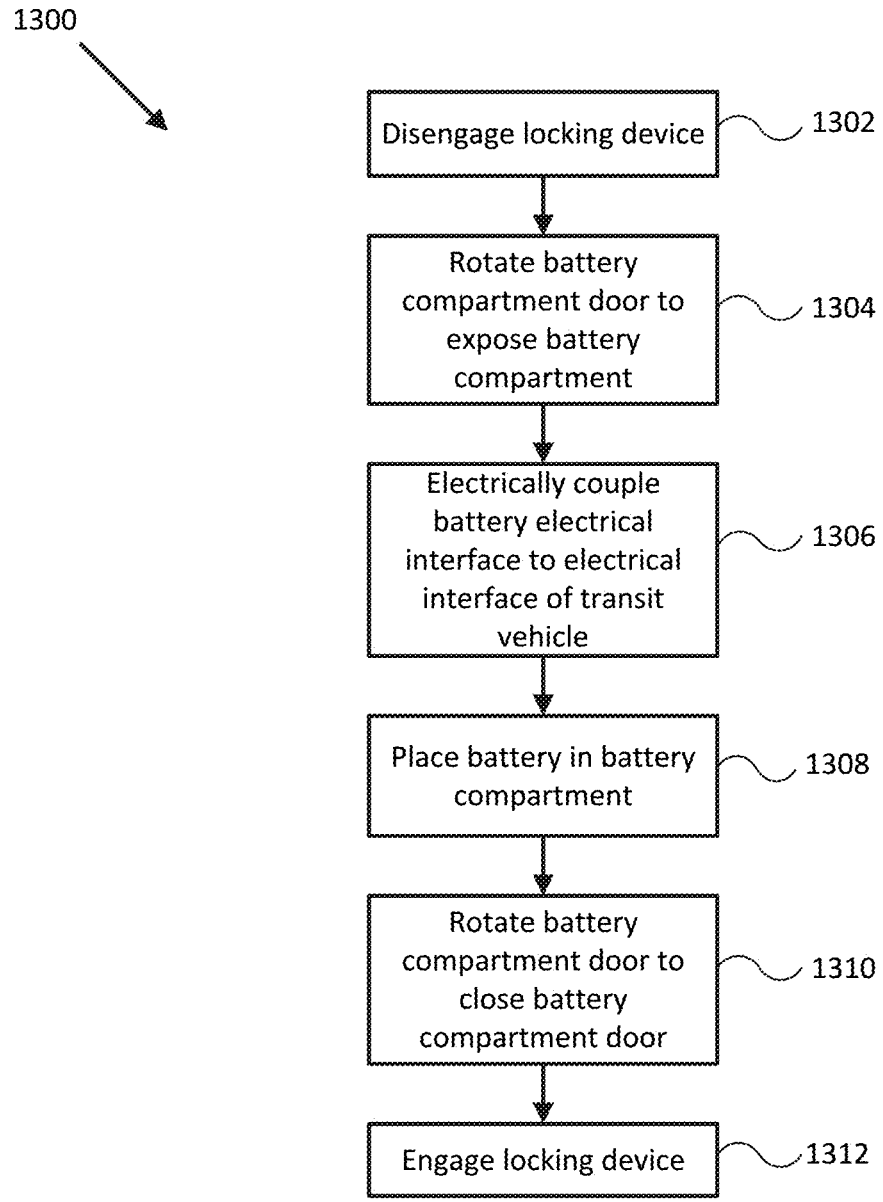
FIG. 13 illustrates a flow diagram of a process for using a battery compartment locking system of a micro-mobility transit vehicle in accordance with embodiments of the disclosure.

FIG. 13 illustrates a flow diagram of a process 1300 for using a micro-mobility transit vehicle 400 that includes a battery compartment locking system 600 in accordance with one or more embodiments of the disclosure. It should be appreciated that any step, sub-step, sub-process, or block of process 1300 may be performed in an order or arrangement different from the embodiments illustrated by FIG. 13. For example, in other embodiments, one or more blocks may be omitted from or added to the process. For illustrative purposes, process 1300 is described in reference to the figures disclosed herein.

At block 1302, locking device 604 may be electromechanically disengaged. For example, worm screw 1208 may be actuated by geared motor 1202 to rotate locking cams 612a and 612b via worm gear shaft 1206 such that locking cams 612a and 612b are disengaged from breakaway tabs 610a and 610b of battery compartment door 402. In some cases, when locking cams 612a and 612b are disengaged from breakaway tabs 610 and 610b, locking device 604 may be referred to as in an unlocked state.

In some embodiments, locking device 604 may receive a wireless communication via a communication module. The wireless communication may contain a signal that instructs a controller on PCB 1204 of locking device 604 to electromechanically disengage locking cams 612a and 612b from breakaway tabs 610a and 610b to unsecure the battery compartment door 402 and a battery 124 from the battery compartment 127. In an example case, a technician may use a mobile device to provide a wireless communication (e.g., NFC tap, signal) to locking device 604, which causes locking device 604 to disengage locking cams 612a and 612b. As such, tool-less unlocking and locking of battery compartment locking system 600 may be performed.

At block 1304, battery compartment door 402 may be rotated about a hinge to expose the battery compartment 127 of micro-mobility transit vehicle 400. In some cases, when battery compartment door 402 is rotated to expose the battery compartment 127, the battery compartment door 402 may be referred to as being in an open position.

At block 1306, a battery electrical interface of a battery may be electrically coupled to an electrical interface of micro-mobility transit vehicle 400. In some cases, the battery may be a replacement battery, new battery, charged battery, recharged battery, or a different battery to suit a particular purpose.

In some embodiments, a previous battery may be removed from the battery compartment 127 before steps are performed at block 1306 or block 1308. In an embodiment, a previous battery may be removed by removing a mechanical interface extending from the previous battery from a receiving interface defined in the battery compartment. For example, one or more protrusions, hooks, legs, knobs, or integrated locking interface may be removed from a complementary receiving interface of the battery compartment such as slots, recessions, holes, etc, as illustrated in FIG. 5. The previous battery may be taken out of the battery compartment 127 by grasping a carrying handle disposed on the battery and removing the battery from the battery compartment 127. In various embodiments, the carrying handle may be elastic up to a threshold stretch and rigid once the threshold stretch is met. For example, the carrying handle may be made of one or more strands of elastic material such as rubber and bound together by a fabric covering.

At block 1308, a battery 124 is placed in the battery compartment. For example, the battery 124 may be a replacement battery, new battery, charged battery, or recharged battery according to one or more embodiments. In one or more embodiments, placing the battery 124 in the battery compartment 127 may include engaging a mechanical interface 504 of the battery with a receiving interface 506 of the battery compartment 127. For example, the battery may have one or more protrusions, hooks, legs, knobs, or integrated locking interface pattern that may be received by a complementary receiving interface 506 of the battery compartment such as slots, recessions, holes, etc. In some cases, the mechanical interface 504 and receiving interface 506 may be located at an end of the battery 124 opposite of an end of battery 124 adjacent to locking device 604.

At block 1310, battery compartment door 402 may be rotated about the hinge to cover the battery compartment 127 of the micro-mobility transit vehicle 400. In some cases, when the battery compartment door 402 is rotated to cover the battery compartment 127, the battery compartment door 402 may be referred to as being in a closed position.

At block 1312, locking device 604 may be electromechanically engaged. For example, worm screw 1208 may be actuated by geared motor 1202 to rotate locking cams 612a and 612b via worm gear shaft 1206 such that locking cams 612a and 612b are engaged (e.g., placed in contact) on breakaway tabs 610a and 610b of battery compartment door 402. In some cases, when locking cams 612a and 612b are engaged on breakaway tabs 610 and 610b, locking device 604 may be referred to as in a locked state.

In some embodiments, locking device 604 may receive a wireless communication via a communication module to perform steps at block 1312. For example, the wireless communication may contain a signal that instructs a controller of locking device 604 to electromechanically engage locking cams 612a and 612b onto breakaway tabs 610a and 610b to secure the battery compartment door 402 and a battery in the battery compartment to the battery compartment. In an example case, a technician may use a mobile device to provide a wireless communication (e.g., NFC tap, signal) to locking device 604, which causes locking device 604 to engage locking cams 612a and 612b.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micro-mobility transit vehicle comprising:
    a frame comprising a battery compartment, the battery compartment comprising a battery, the battery comprising a battery enclosure and at least one protrusion extending from the battery enclosure; and
    a battery compartment door having a first end and a second end, wherein a first side of the battery compartment door is configured to provide a floorboard surface for the micro-mobility transit vehicle;
    wherein the first end of the battery compartment door is coupled to the frame;
    wherein the second end of the battery compartment door comprises:
        at least one pair of prongs extending from the second end of the battery compartment door and on a second side of the battery compartment door that is opposite of the first side comprising the floorboard surface; and
        at least one breakaway tab physically coupled to the at least one pair of prongs of the battery compartment door; and
    wherein in an event when the battery compartment door is forcefully removed from the micro-mobility transit vehicle, the at least one breakaway tab is configured to physically separate from the at least one pair of prongs of the battery compartment door and remain secured over the at least one protrusion of the battery enclosure to secure the battery enclosure in the battery compartment.

2. The micro-mobility transit vehicle of claim 1, wherein the micro-mobility transit vehicle comprises an electrical interface configured to couple to a battery electrical interface.

3. The micro-mobility transit vehicle of claim 1, further comprising:
    a locking device mounted to the frame and comprising one or more locking cams, wherein the locking device is configured to electromechanically engage the one or more locking cams on the at least one breakaway tab to secure the battery and the battery compartment door to the frame.

4. The micro-mobility transit vehicle of claim 3, wherein the one or more locking cams are configured to rotate through a space defined by the at least one pair of prongs and the at least one breakaway tab to engage the at least one breakaway tab to secure the battery and the battery compartment door to the frame.

5. The micro-mobility transit vehicle of claim 4, wherein:
    the locking device comprises a worm gear and an electromechanical actuator;
    the worm gear is configured to be actuated by the electromechanical actuator and disengage the one or more locking cams from the at least one breakaway tab to release the battery and the battery compartment door from the frame; and
    the electromechanical actuator is configured to detect a presence of the battery compartment door based on a rotation of the one or more locking cams.

6. The micro-mobility transit vehicle of claim 3, wherein the locking device is configured to electromechanically engage the one or more locking cams in response to receiving an indication that the battery compartment door is in a closed position.

7. The micro-mobility transit vehicle of claim 6, wherein the battery compartment door is in the closed position when the battery compartment door is placed over the battery compartment and the battery such that the at least one breakaway tab rests on the battery enclosure.

8. The micro-mobility transit vehicle of claim 1, wherein:
    the at least one pair of prongs extending from the second end is two pairs of prongs; and
    the at least one breakaway tab physically coupled to the at least one pair of prongs is two breakaway tabs.

9. The micro-mobility transit vehicle of claim 1, wherein the at least one protrusion extending from the battery enclosure is configured to insert into a receiving mechanical interface disposed in the frame.

10. The micro-mobility transit vehicle of claim 2, wherein the battery further comprises a battery cell disposed within an enclosure cavity of the battery enclosure, and wherein the battery cell is electrically coupled to the battery electrical interface.

11. The micro-mobility transit vehicle of claim 2, wherein the battery electrical interface is configured to electrically coupled to the electrical interface of the micro-mobility transit vehicle.

12. The micro-mobility transit vehicle of claim 3, wherein operations of the locking device are controlled in response to receiving a wireless communication from one or more of a user device or a management system associated with the micro-mobility transit vehicle.

13. The micro-mobility transit vehicle of claim 12, wherein the wireless communication comprises a signal instructing a controller of the locking device to electromechanically engage the one or more locking cams on the at least one breakaway tab to secure the battery and the battery compartment door to the frame.

14. The micro-mobility transit vehicle of claim 12, wherein the wireless communication comprises a signal instructing a controller of the locking device to electromechanically disengage the one or more locking cams from the at least one breakaway tab to release the battery and the battery compartment door from the frame.

15. The micro-mobility transit vehicle of claim 12, wherein the wireless communication comprises a near field communication (NFC) signal.

\* \* \* \* \*